July 20, 1965   J. MERCIER   3,195,576
PRESSURE VESSELS
Filed June 27, 1961   2 Sheets-Sheet 1
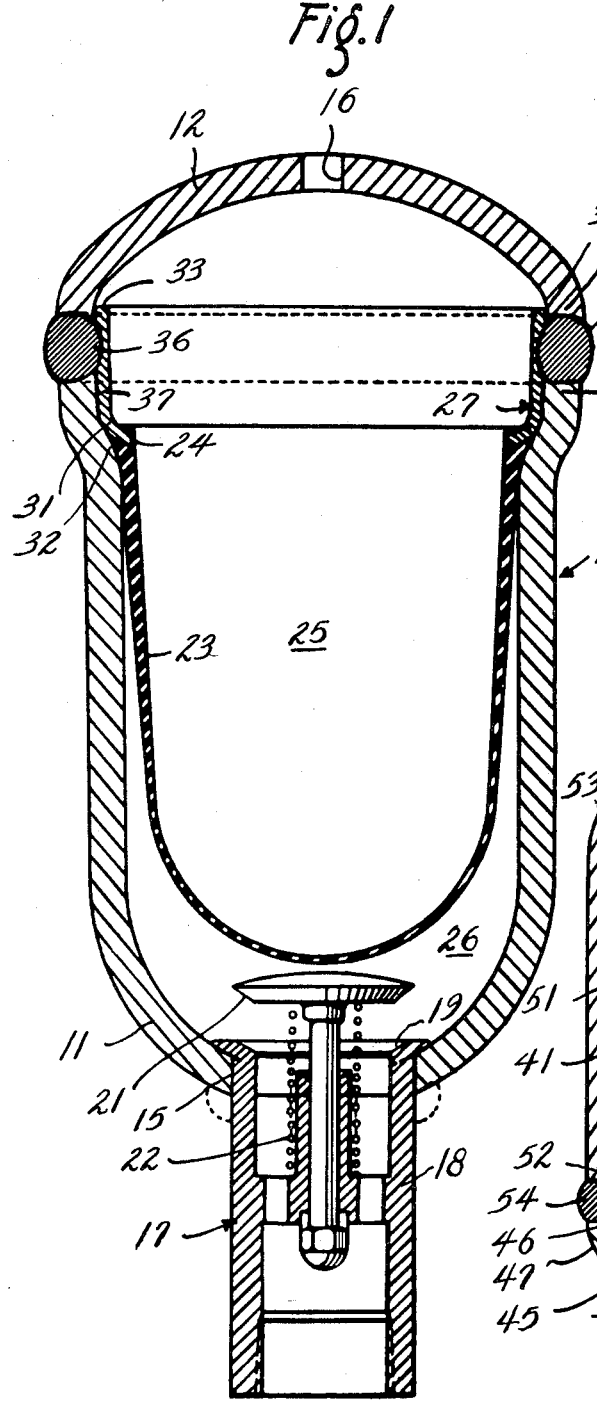
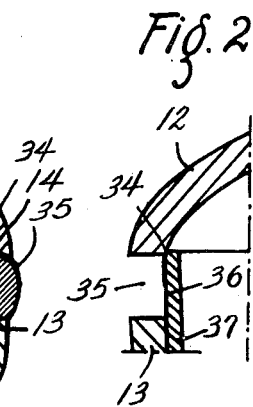
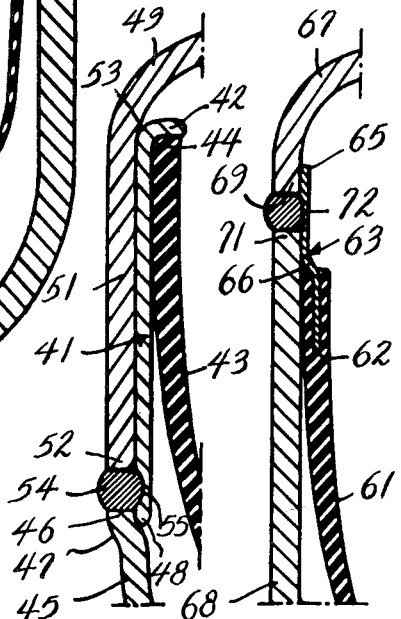
INVENTOR
JEAN MERCIER
BY Dean, Fairbanks & Hirsch
ATTORNEYS July 20, 1965  J. MERCIER  3,195,576
PRESSURE VESSELS
Filed June 27, 1961  2 Sheets-Sheet 2
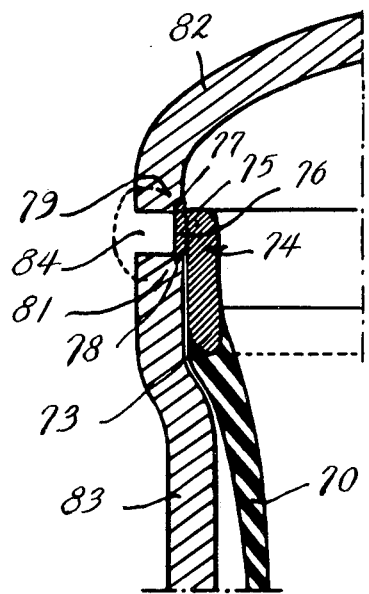
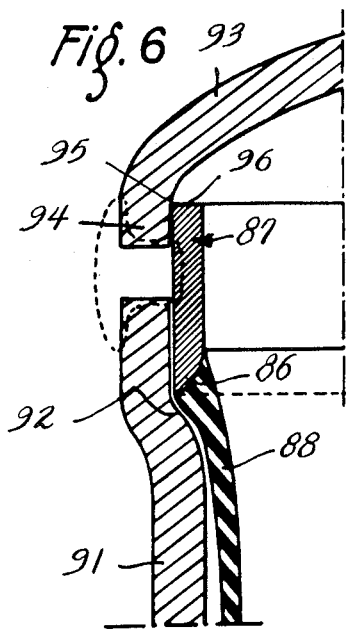
INVENTOR
JEAN MERCIER
BY
Dean, Fairbank & Hirsch
ATTORNEYS 3,195,576
PRESSURE VESSELS
Jean Mercier, 1185 Park Ave., New York, N.Y.
Filed June 27, 1961, Ser. No. 120,082
Claims priority, application France, July 4, 1960, 833,151
9 Claims. (Cl. 138—30)

This invention relates to the art of pressure vessels, more particularly of the type having a deformable partition supported by an annular supporting member in said pressure vessel.

It is among the objects of the invention to provide a pressure vessel of the above type which is dependable in operation and not likely to become deranged even with long repeated use, and may readily be assembled at relatively low cost and which utilizes relatively simple components which do not require extreme tolerances in the manufacture thereof.

According to the invention, the pressure vessel comprises a rigid metal container composed of two substantially cup-shaped shells having the mouths thereof of substantially the same diameter and adapted to be juxtaposed. Positioned in the pressure vessel is an annular supporting member of metal compatible with that of the shells, so that an integral bond may be formed therebetween, which annular supporting member has secured thereto a deformable partition or bladder which defines a gas chamber and an oil chamber in the pressure vessel.

The annular supporting member is designed to be positioned in the pressure vessel so that a portion thereof will be aligned with a space between the juxtaposed rims of the two shells. Thus, when the rims and the aligned portion of the supporting member are bonded together, a firm connection will be provided, the support for the deformable partition itself forming a portion of that firm support.

More particularly, according to one aspect of the invention, the shells and the supporting member are conformed so that when they are juxtaposed, the adjacent rim portions of the shells will be spaced from each other by a predetermined amount.

In the accompanying drawings in which are shown one or more of various possible embodiments of the several features of the invention, FIG. 1 is a longitudinal sectional view of a pressure vessel according to one embodiment of the invention, FIG. 2 is a detail view of the bonding region of the embodiment of FIG. 1, and FIGS. 3 to 6 are detail views of the bonding region of other embodiments of the invention.

Referring now to the drawings, the invention is incorporated in a pressure accumulator which, as shown in FIG. 1, comprises a container 10 of rigid metal capable of withstanding relatively high pressure. The container comprises two complementary shells 11 and 12, the rims 13, 14 of the mouths of which are substantially of the same diameter. Each of the shells 11 and 12 has an axial opening 15 and 16, the opening 16 being adapted to receive a suitable gas valve (not shown) and the opening 15 being adapted to receive a suitable closure member 17.

As shown in FIG. 1, the closure member 17 comprises a cylindrical sleeve 18 affixed as by welding in the opening 15, the inner end of the sleeve in the container defining a seat 19 for a poppet valve head 21 normally urged by a spring 22 to open position. As the closure member 17 may be of any conventional type and per se forms no part of this invention, it will not be further described.

Positioned in the container is a flexible deformable partition 23 which may be of rubber or of material having like characteristics. The partition illustratively is a bladder having an enlarged mouth 24 and said bladder is designed to be positioned in the shell 11. The bladder divides the container 10 into two chambers, i.e., a gas chamber 25 in communication with the port 16 and an oil chamber 26 in communication with the port 15.

According to the invention, the flexible partition or bladder 23 has its mouth 24 secured as by bonding to the edge of an annular supporting member or belt 27. The annular supporting member is designed to be aligned, in the interior of the container, with the juxtaposed rims of the shells 11 and 12 so that the supporting member and said rims may be rigidly secured together by a suitable bonding operation. The annular supporting member is of metal compatible with that of the shells so that the elements may be bonded together as by welding or soldering in a single operation.

More particularly, as shown in FIG. 1, for example, the annular supporting member has a curved inwardly extending portion 31 at its lower edge designed to seat on the correspondingly curved surface 32 adjacent the rim 13 of the shell 11. With the supporting member 27 so positioned, when the rim of the shell 12 is positioned over the upper edge 33 of the supporting member 27 it will rest thereon as at 34 so that the adjacent rims 13, 14 of the two shells are spaced from each other as at 35, a portion 36 of the supporting member 27 extending across such space.

Not only does the curved portion 32 of the shell 11 serve to limit the movement of the annular supporting member 27 into such shell, but it also serves as a guide surface for the portion of the partition or bladder 23 secured or bonded to the rounded portion 31 of said supporting member.

In order to assemble the unit, the annular supporting member 27 with the flexible partition or bladder 23 bonded to the lower edge thereof, is positioned in the shell 11 so that the curved surface 31 of the supporting member rests on the correspondingly curved surface 32 of said shell. Thereupon, the shell 12 is positioned so that its mouth encompasses the upper edge 33 of the supporting member 27 as is clearly shown in FIGS. 1 and 2. With the parts thus assembled, the adjacent rims 13, 14 of the shells 11 and 12 will be separated from each other by a distance 35 which is determined by the width of the flat portion 37 of the annular supporting member and the location of the abutment of the curved surface 31 of the supporting member and the upper edge 33 thereof against the shell 11 as at 34 and the shell 12 as at 34, respectively.

With the elements thus assembled, the unit is then preferably rotated about its vertical axis and a bond is formed between the adjacent rims 13, 14 and the portion 36 of the annular supporting member 27 exposed in the space 35, the bonding material during, say, the welding operation, biting into such adjacent rims and exposed portion 36 of the annular supporting member so that the weld or bond thus formed is at least as strong as the portions which it holds together.

As the flat portion 37 of the annular supporting member presses tightly against the inner surface of the shells adjacent their rims, none of the bonding material will drop into the accumulator and cause injury to the bladder or partition.

Thereupon, as soon as the welding operation is completed, which takes a relatively short time, the unit is then immersed into a cooling bath to avoid excessive transmittal of heat to the bladder. Prevention of such excessive transmission of heat is also accomplished by the fact that the portion of the supporting member that is welded is spaced sufficiently from the lower edge portion 31 thereof to which the deformable partition is bonded to prevent injury to the latter.

In the embodiment shown in FIG. 3, the annular supporting member 41 has a relatively great width and the upper edge thereof is inwardly bent as at 42 to define an annular flange. The flexible and deformable partition or bladder 43 has its mouth 44 secured as by bonding to such flange 42 and depends therefrom. The shell 45 of the accumulator adjacent its rim 46 has an inwardly curved portion 47 which defines a stop or abutment for the lower edge 48 of the annular supporting member 41 as shown in FIG. 3. The shell 49 has a relatively elongated cylindrical portion 51 extending upwardly from its rim 52 and then is curved at its upper portion defining an abutment portion 53 to restrict inward movement of the annular supporting member 41 into the shell 51.

In assembling the embodiment shown in FIG. 3, the annular supporting member 41 with the bladder bonded thereto is first positioned in the shell 45 so that the lower edge 48 of the annular supporting member rests against the inwardly curved portion or abutment 47. Thereupon, the shell 49 is positioned so that its cylindrical portion 51 encompasse the elongated portion of the supporting member. By reason of the abutment of the portion 53 of the shell 49 against the inwardly extending flange 42 of the supporting member, a space 54 will be provided between the adjacent rims 46 and 52 of the shells.

Thereupon, such rims and the portion 55 of the supporting member exposed in the space 54 are bonded together as by welding in the manner previously described and the unit then plunged into a cooling bath.

By reason of such rapid cooling action and the relatively great width of the annular supporting member, which will prevent rapid transmission of heat from the bonding region to the bladder, injury to the bladder is precluded.

In the embodiment shown in FIG. 4, the flexible partition or bladder 61 is bonded to the lower portion 62 of an annular supporting member 63. As is clearly shown, the lower portion of the annular supporting member is embedded in the rim portion of the bladder and the upper portion 65 of the annular supporting member extends upwardly beyond such rim portion, the annular supporting member being bent at its mid-portion as at 66 so that the outer surface of the upper portion thereof and the outer surface of the partition adjacent its rim are in substantially the same vertical plane.

In assembly the embodiment shown in FIG. 4, the annular supporting member is force-fit with respect to the shells 67 and 68, and the space between the adjacent rims 69, 71 of said shells is controlled by wedges of suitable thickness. Thereupon, the welding of the adjacent rims of the shells 67 and 68 and the portion 72 of the annular supporting member exposed in such space is accomplished in the manner previously described and after the welding is completed the unit is cooled, also as previously described.

In the embodiment shown in FIG. 5, the deformable partition or bladder 70 is bonded to the lower edge 73 of an annular supporting member 74, said lower edge desirably being rounded as shown. The outer surface of the annular supporting member 74 adjacent its upper edge 75 has an annular portion 76 extending laterally outward with the upper edge 77 of such portion rising above the main upper edge portion 75 of the supporting member. The lower edge 78 of said laterally extending portion is desirably bevelled to form a relatively sharp edge. Said relatively sharp edge 78 and the upwardly extending portion 77 define abutments for the adjacent rims 79, 81 of shells 82 and 83 of the accumulator container, said rim portions having annular recesses to receive such abutments. Thus, the spacing 84 between the adjacent rims 79, 81 will be dependent upon the width of such laterally extending portion which may of course be as wide as desired. In assembling the accumulator shown in FIG. 5, when the welding operation is performed, the adjacent rims 79 and 81 and the protruding portion 76 will be used together to form a secure bond, the abutments 77 and 78 also fusing so that the entire assembly forms an integral unit.

In the embodiment shown in FIG. 6, the inner surface 86 of the lower edge of the annular supporting member 87 is curved as shown and the deformable partition or bladder 88 is bonded to such curved portion. The shell 91 of the accumulator has an inwardly curved portion 92 against which the lower edge of the annular supporting member will abut to limit the movement of the latter into the shell 91 and the shell 93 adjacent is rim 94 is designed to abut as at 95 against the upper edge 96 of the annular supporting member. The unit shown in FIG. 6 is then welded in the manner previously described with respect to the embodiment of FIG. 1.

With the method and arrangement above described, a pressure vessel may readily be assembled with assurance that the joint between the two parts thereof and the annular supporting member which may be formed in the single bonding operation will be extremely strong and retain the parts dependably together.

As many changes could be made in the above construction and method and many apparently widely different embodiment of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel of the type comprising a metal container, said container comprising two substantially cup-shaped shells having the rims of the mouth portions thereof of substantially the same diameter, an annular supporting member in said container of material compatible with that of said shells, a deformable partition bonded to the annular supporting member and positioned in said container defining a gas chamber and an oil chamber therein, means independent of said deformable partition and integral with said shells to space the adjacent rims of said shells to expose at least a portion of the annular supporting member, and means rigidly bonding said adjacent rims and the exposed portion of said annular supporting member together.

2. The combination set forth in claim 1 in which the means to space the rims of said shells comprises portions on the inner surface thereof adapted to abut against the opposed upper and lower edges respectively of said annular supporting member to limit the movement of said shells with respect to said supporting member, therefore defining the space between the adjacent rims of said shells.

3. The combination set forth in claim 2 in which one of said shells adjacent its rim has an inwardly curved surface against which the lower edge portion of said annular supporting member abuts, and the other of said shells adjacent its rim is curved to define an abutment for the upper edge of said annular supporting member.

4. The combination set forth in claim 1 in which said annular supporting member has a lower portion to which the rim of said partition is bonded and an upper portion of outer diameter slightly greater than the inner diameter of the shells, whereby said shells may be secured to said upper portion as by force fit.

5. The combination set forth in claim 1 in which said annular supporting member has an annular portion extending laterally outward therefrom adjacent its upper edge, said annular portion having its upper edge rising above the main portion of the upper edge of said annular supporting member and its lower edge being beveled and having a portion spaced from the adjacent surface of said annular supporting member, said laterally extending annular portion being positioned between adjacent rims of said shells to space the latter.

6. The combination set forth in claim 5 in which the adjacent rims of said shells each has an annular recess adjacent the inner edge thereof to receive the upper and lower edges of said laterally extending portion.

7. The combination set forth in claim 1 in which the lower edge of said annular supporting member is inwardly curved and a portion of one of said shells adjacent its rim is correspondingly curved to serve as a seat for said curved edge of said annular supporting member.

8. The combination set forth in claim 1 in which the inner surface of said annular supporting member at its lower edge is curved outwardly and the rim of said partition is bonded to such curved surface.

9. The combination set forth in claim 1 in which the annular supporting member is of relatively great width and has an inwardly extending flange at its upper edge, one of said shells adjacent its rim is inwardly curved defining an abutment for the lower edge of said relatively wide annular supporting member, the portion of the other shell adjacent its rim being elongated and substantially cylindrical and said other shell having an inwardly curved portion above such cylindrical portion to define an abutment for the upper edge of said annular supporting member, the rim of said partition being secured to said inwardly extending flange of said annular supporting member.

References Cited by the Examiner

UNITED STATES PATENTS

| | | | |
|---|---|---|---|
| 2,331,325 | 10/43 | Jensen | 29—157 |
| 2,345,124 | 3/44 | Huber | 138—30 |
| 2,435,697 | 2/48 | Powers | 29—157 |
| 2,878,834 | 3/59 | Mercier | 138—30 |
| 2,919,718 | 1/60 | Mercier | 138—30 |
| 2,924,244 | 2/60 | Mercier | 138—30 |
| 2,931,392 | 4/60 | Mercier | 138—30 |
| 2,932,321 | 4/60 | Mercier | 138—30 |
| 3,001,268 | 9/61 | Greer | 29—157 |

EDWARD V. BENHAM, *Primary Examiner.*

LEWIS J. LENNY, *Examiner.*